Patented Jan. 30, 1951

2,539,824

UNITED STATES PATENT OFFICE 2,539,824

NITRATION DERIVATIVES OF HYDROCARBON COPOLYMERS

John D. Garber, Cranford, David W. Young, Roselle, and William J. Sparks, Cranford, N. J., assignors to Standard Oil Development Company, a corporation of Delaware No Drawing. Application April 20, 1945, Serial No. 589,466

15 Claims. (Cl. 260—88.1)

This invention relates to novel chemical derivatives of high molecular weight synthetic copolymers, and to methods of preparing and using same, and more particularly it relates to the preparation and use of nitrated copolymers comprising a reactive cyclic constituent and at least one aliphatic constituent. The invention may be illustrated by the nitration of a styrene-isobutylene copolymer, and the application of the resultant nitrated copolymers for specified purposes as will be described.

Copolymers of styrene and isobutylene, and more generally copolymers of aliphatic olefins with polymerizable mono-olefinic cyclic hydrocarbon compounds, are disclosed in U. S. Patent 2,274,749. The general method of preparing such copolymers is also disclosed therein and consists essentially in carrying out the copolymerization of the mixed reactants at a temperature below 0° C. such as —10° C., —50° C., —80° C., —100° C., or even lower, in the presence of an active halide polymerization catalyst, and preferably in the presence of an inert, volatile organic liquid serving as solvent and refrigerant.

Instead of styrene, other polymerizable cyclic material may be used such as alphamethyl styrene, paramethyl styrene, alphamethyl paramethyl styrene, indene, terpene, coumarone, etc., as well as copolymers of indene and coumarone.

Instead of isobutylene, other isoolefins may be used such as isoamylene, particularly methyl-2 butene-2, iso-octylene etc., as well as other aliphatic olefins such as propylene, normal butylene, etc.

The proportions in which the styrene or other polymerizable cyclic material and the isobutylene or other aliphatic olefin material may be copolymerized may vary over a wide range from 1% to 50% or 90% or even 99% of the polymerizable cyclic constituent. In fact, an even smaller amount of such cyclic material may be used such as even 0.1% or less, it being sufficient to merely have 1 or 2 molecules of the styrene or other polymerizable cyclic material combined into a relatively long chain of isobutylene or other aliphatic olefin, the aromatic nucleus of the styrene serving as a chemical handle by which the high molecular weight resultant copolymer may be subjected to the subsequent chemical reaction according to the present invention.

For convenience and brevity, the above described copolymer of a cyclic polymerizable material and an olefin will be referred to as a cycalkene copolymer. The specific type of copolymer made from styrene and isobutylene will similarly be referred to for brevity as stybutene. The invention will be illustrated as applied particularly to stybutene, although it is not to be limited thereto.

The copolymer to be used may also be a tripolymer of a polymerizable cyclic compound, and olefinic compound and a small amount between 0.1%–30% or so, preferably 0.5% to 10% of a diolefin, e. g. isoprene, butadiene, etc. One example of such a tripolymer is one comprising about 50% of isobutylene, 47% of styrene and 3% of isoprene, in the combined state.

Still further copolymers may be used such as those made by copolymerizing a diolefin such as butadiene, isoprene, etc. or other polyolefins, with a polymerizable cyclic compound which after copolymerization, will still contain a reactive cyclic nucleus such as the benzene ring in a styrene group, as for instance, copolymers of styrene with butadiene or styrene and isoprene.

Broadly, the present invention comprises nitrating any of the above types of copolymers by reaction with nitric acid or any other suitable nitrating agent such as a mixture of sulfuric acid with either nitric acid or potassium nitrate.

Fuming nitric acid dissolved in methyl chloride or other suitable solvent makes a very satisfactory nitrating agent.

The nitration reaction is preferably carried out at a temperature between the approximate limits of —50° C. to 125° C., and preferably in the presence of about 0.5 to 10 volumes of methyl chloride, petroleum ether, $CCl_4$, or other suitable solvents per volume of copolymers treated. The amount of nitrating agent and the severity of the nitrating conditions can be varied in order to control the amount of nitrogen or $NO_2$ introduced into the copolymer. The amount of nitrogen in the nitrated copolymer may vary from about 0.1% to 15% by weight of nitrogen.

The nitrated copolymers of this invention may vary in texture and other properties, according to the type of original copolymer treated, i. e., the type of polymerizable cyclic compound and the nature of the one or more aliphatic constituents copolymerized therewith, as well as the molecular weight of the original copolymer which may be at least 2,000 and the percentage of combined cyclic constituent, as well as also upon the degree of nitration. Thus, a wide variety of different products can be obtained according to this invention. The degree of solubility or compatibility of these nitrated copolymers in other products such as olefins, polyolefins, solvents, plastics, etc., can be regulated largely by the degree of nitration.

The nitrated copolymers of this invention may be used per se as new products by sheeting them into self-supporting films or drawing or extruding them into fibers, or compounding them with volatile or non-volatile solvents to form pastes or other plastics compositions or spreadable coating compositions. Pigments, dyes, carbon black, clay, zinc oxide or other inert fillers may be compounded therewith. They may also be blended with aromatic solvents such as toluene, benzene, tetrahydronaphthalene, aromatic petroleum liquids, various oxygen-containing solvents such as ether, methyl ethyl ketone, acetone, etc., and even to some extent in relatively saturated petroleum hydrocarbon fractions such as naphtha, kerosene, etc. They may also be used for thickening or otherwise improving other liquid products such as fatty oil, linseed oil, soybean oil, etc., as well as paints, lacquers, and other coating compositions.

These nitrated copolymer products may also be used in relatively small proportions to modify various other petroleum products such as paraffin wax, asphalt, lubricating oils, or greases, etc., or small amounts of these various petroleum fractions may be added to major proportions of the nitrated copolymers in order to modify the characteristics of the latter.

The nitrated copolymers of this invention may also be compounded by hot milling, kneading, solvent solutions, etc. with numerous other types of resins or plastics, e. g., shellac, coumarone-indene, resins, resins of the phenol formaldehyde type, polymethyl methacrylate or other polymerized acrylic esters, polystyrene, polyvinyl chloride and/or—acetate, cellulose acetate, nitro cellulose, etc., or they may be compounded in small proportions with natural rubber or predominantly aliphatic types of synthetic rubber such as the isobutylene-isoprene synthetic rubber made at low temperature and generally known as GR-I rubber, or polymers such as polyisobutylene, or they may be used in substantially large proportions to modify synthetic rubber of the butadiene-styrene type such as that known as GR-S.

As a further feature of this invention, the novel nitrated copolymers described can then be converted by chemical reduction to the following type of derivatives:

—$NH_2$ compounds
—NO compounds
—NHOH compounds
—NOH compounds
—N=N compounds
—NH—NH compounds
—N=N—O compounds These products have value as detergents, dyes, insecticides, film-forming materials, synthetic rubber, explosives, resins, and resin modifiers, and chemical intermediates.

Many other derivatives of the nitrated copolymers can also be formed, including salt, acetylated and methylated derivatives, as well as interlinked or cross-linked compounds formed, for instance, by reaction of the corresponding amino derivatives with interlinking agents such as formaldehyde.

Films of the nitrated copolymers such as a nitrated stybutene, have been coated on various other materials such as rubber, wood, metal, paper, cloth, etc., by treating the latter with a solvent solution of the nitrated copolymer and then allowing the solvent to evaporate.

One feature of the invention is that by the nitration reaction, hydrocarbon-soluble products which may even sometimes be tacky, may be converted into hydrocarbon-insoluble non-tacky products.

The invention will be better understood from a consideration of the following experimental data.

*Example 1*

A solution of stybutene (styrene-isobutylene copolymer) having a combined styrene content of about 60% and an intrinsic viscosity of 0.63, made at $-100°$ C., was dissolved in carbon tetrachloride, using 15.82 gms. of the stybutene and 55 cc. of $CCl_4$, and the resulting solution was carefully poured over 100 cc. of sulfuric acid, and the mixture was kept below 25° C. on a bath of ice water, and to it was slowly added (during 1½ hours) with vigorous stirring, a solution of 24.5 gms. of potassium nitrate in 50 cc. of sulfuric acid. The initial orange-red color faded to yellow when about one-fourth of the nitrating solution had been added. When all of the nitrating mixture was added the reaction mixture was allowed to stand until the temperature reached 30° C. It was then poured over a large quantity of ice, the $CCl_4$ layer was removed, and the aqueous layer was extracted with four 30 cc. portions of $CCl_4$. The nitrated copolymer was insoluble in $CCl_4$ as well as in cold water. This product was washed thoroughly with water and ammonium hydroxide, and finally with water. The washed nitrated stybutene was soluble in methylethyl ketone, insoluble in toluene at temperatures below 20° C., and upon chemical analysis was found to contain 1.8% nitrogen. It had an intrinsic viscosity of 0.53 in methylethyl ketone.

*Example 2*

5 gms. of a stybutene having a combined styrene content of about 50% by weight, made at $-103°$ C., and having an intrinsic viscosity of 0.88, was dissolved in 20 cc. of pure $CCl_4$ at room temperature. To this copolymer solution was slowly added with agitation 6 gms. of C. P. 96% $H_2SO_4$ and then 2.5 gms. of laboratory grade $HNO_3$. The mixture was held, by the use of ice water external cooling, to 25° C. As the $HNO_3$ was added the nitrated product came out of the $CCl_4$ solution. This product was filtered from the $CCl_4$, acid mixture washed with water, $NH_4OH$, water and $NaHCO_3$ and water. The resulting nitrated stybutene copolymer contained 4.10% N, 76.26% C. and 9.81% H by analysis. This polymer was insoluble in toluene and soluble in methyl ethyl ketone. A film of this polymer was found to be non-tacky and had a tensile strength of 3,400 lbs./sq. in., which is surprisingly high.

*Example 3*

204 gms. of a stybutene having a combined styrene content of about 60% and made at $-103°$ C., was dissolved in 1500 cc. of $CCl_4$ and to the resulting solution was added 100 cc. of concentrated $H_2SO_4$. Then 150 cc. of laboratory grade $HNO_3$ was added. The mixture was agitated at room temperature but after about one half hour the temperature was increased to 80° C. After about one hour the insoluble nitrated stybutene was removed by filtration, washed with water, ammonium hydroxide, water and dried at 70° C. for three days. The product was then washed again and was dried at room temperature for seven days. The hard yellow nitrated copolymer was insoluble in toluene but was soluble in acetone and methylethyl ketone. It was purified by a solution in methylethyl ketone and precipitation at room temperature by adding a light hydrocarbon liquid, namely di-isobutylene. The pure highly nitrated stybutene was found to contain 8.68% nitrogen, 8.40% H, 5.11% S and 52.80% C, and tests indicated that this resin had value as a coating material when coated from solution on paper, steel, and other materials.

*Example 4*

A tripolymer having an intrinsic viscosity of 0.95 and containing 40% styrene, 57% isobutylene, and 3% isoprene, and referred to for brevity as stybuprene, was dissolved in $CCl_4$ in a concentration of 12 gms. per 100 cc. To 500 cc. of this solution in a Pyrex beaker was added 100 cc. of 96% $H_2SO_4$ and 100 cc. of fuming nitric acid. The mixture was agitated at room temperature as the acid was added. After about five minutes the heat of reaction was so great that the $CCl_4$ started to be evolved. At this point the beaker was cooled externally with cold water. After 1 hour at about 35° C. the insoluble nitrated product was removed from the solvent and acid by filtration. The yellow nitrated polymer was washed with water and $NH_4OH$, and water. Analysis indicated the product contained 11.82% N. Unlike stybutene, this nitrated stybuprene tripolymer was very easy to burn, and tests indicated that the product was then explosive.

*Example 5*

A copolymer (30% styrene-70% methylpentadiene) was added to $CCl_4$ at room temperature. The concentration of polymer in $CCl_4$ was 3 g./100 ml. This polymer solution (15 ml.) was treated at 10° C. with 5 ml. of 98% $H_2SO_4$ and 4 ml. of 1-1 $HNO_3$, $BF_3$ gas was added to the mixture as the $HNO_3$ was added. $BF_3$ gas was passed into the mixture as $HNO_3$ was added, according to the procedure of U. S. Patent 2,314,212. A reaction took place at room temperature. The polymer came out of solution. This product was washed with water, $NH_4OH$ sol, $NaHCO_3$ sol, and water. The product was dried at 78° C. for 2 days. The light yellow product could be compounded in high mol. wt. polybutene. Tests indicated the polymer contained 0.58% N. This product was insoluble in dimer, slightly soluble in toluene at temperatures above 20° C. and soluble in a light petroleum base (−9V1) oil at 100° F. The mol. wt. of the nitrated polymer was about 19,000 Staudinger.

*Example 6*

10 gms. of a styrene-isoprene copolymer, referred to for brevity as a styprene, containing about 40% of combined isoprene, was dissolved in 150 cc. of $CCl_4$ and nitrated by treating with 5 cc. of concentrated sulfuric acid and then 5 cc. of concentrated nitric acid. The mixture was allowed to stand overnight and then poured into a beaker containing 5 volumes of isopropyl alcohol. The product which was a nitrated styprene, was then washed in a 10% $NaHCO_3$ solution, then in water and filtered, and finally dried in a vacuum oven at 60° C. The dried product weighed 11.2 gms.

*Example 7*

10 gms. of an indene-isobutylene copolymer containing about 50% by weight of combined indene and made at a temperature of about −103° C., was dissolved in 50 cc. of $CCl_4$ and treated with 5 cc. each of $H_2SO_4$ and $HNO_3$. A cloudy precipitate began to form as soon as the $HNO_3$ was added. When the reaction was complete, the $CCl_4$ solution was poured into alcohol and the precipitated polymer (insoluble in $CCl_4$) was also treated similarly, thereby producing two different nitrated indene-isobutylene copolymer, one of which was $CCl_4$-soluble, and the other $CCl_4$-insoluble, the latter being presumably more highly nitrated. These two nitrated copolymers were recovered as previously described, and weighed 5.3 gms. and 5.9 gms. respectively.

It is not intended that this invention be limited to the specific materials which have been given merely for the sake of illustration, but only by the appended claims in which it is intended to claim all novelty inherent in the invention as well as all modifications coming within the scope and spirit of the invention.

What is claimed is:

1. Process which comprises nitrating a copolymer having a molecular weight of at least 2000 of 1 to 60% by weight of a polymerizable mono-olefinic aromatic hydrocarbon compound and 99 to 40% by weight of an aliphatic olefinic hydrocarbon compound to produce a nitrated copolymer, said nitration being carried out at a temperature between −50° C. and 125° C. and in the presence of 0.5 to 10 volumes of solvent per volume of copolymer.

2. Process which comprises nitrating a styrene-isobutylene copolymer at a temperature of about 10 to 80° C., and in the presence of 0.5 to 10 volumes of saturated aliphatic organic solvent per volume of copolymer to produce a nitrated styrene-isobutylene copolymer having a nitrogen content of 0.1 to 15% by weight.

3. The process which comprises nitrating a copolymer having a molecular weight of at least 2000 of 1 to 60% by weight of a polymerizable mono-olefinic aromatic hydrocarbon compound and 99 to 40% by weight of at least one polymerizable aliphatic hydrocarbon compound, with a nitrating agent at a temperature of 10 to 80° C. to produce a nitrated copolymer having a nitrogen content of 0.1 to 15%, and then at least partially reducing at least some of the nitro groups in the resultant nitrated copolymer.

4. Process which comprises reacting a styrene-isobutylene copolymer having a combined styrene content of about 40 to 60% by weight and having a molecular weight of at least 2,000 with nitric acid, in the presence of a chlorinated hydrocarbon solvent at a temperature of about 10 to 80° C., to make a nitrated styrene-isobutylene copolymer having a nitrogen content of 0.1 to 15% by weight.

5. The process which comprises nitrating a styrene-isobutylene copolymer having an intrinsic viscosity of 0.4 to 0.95, and having a combined styrene content of 40 to 60% by weight, by reacting it while dissolved in carbon tetrachloride with nitric acid in the presence of sulfuric acid at a temperature of 10 to 80° C., to produce a nitrated styrene-isobutylene copolymer having a nitrogen content of 0.1 to 15%.

6. A nitrated copolymer of at least 2000 molecular weight of 1 to 60% by weight of a polymerizable mono-olefinic aromatic hydrocarbon compound and 99 to 40% by weight of an aliphatic olefinic hydrocarbon compound, said nitrated copolymer having a nitrogen content of 0.1 to 15%.

7. A nitrated copolymer having a molecular weight of at least 2000 of 1 to 60% by weight of a styrene and 99 to 40% by weight of an olefin having three to five carbon atoms, said nitrated copolymer having a nitrogen content of 0.1 to 15%.

8. A nitrated styrene-isobutylene copolymer having a molecular weight of at least 2,000 of 40 to 60% combined styrene content, said nitrated copolymer having a nitrogen content of 0.1 to 15%.

9. A thin, continuous, self-sustaining film of a nitrated copolymer defined in claim 6, said nitrated copolymer film being substantially insoluble in toluene and soluble in methyl ethyl ketone.

10. A thin, continuous, flexible, self-sustaining film composed essentially of a nitrated styrene-isobutylene copolymer having a combined styrene content of about 50% and an intrinsic viscosity of about 0.88, said nitrated copolymer film having a nitrogen content of about 4.1% and being substantially insoluble in toluene and solube in methyl ethyl ketone, and having a tensile strength of about 3400 lbs. sq./in., and being substantially non-tacky.

11. A coating composition comprising a major proportion of solvent liquid, containing dissolved therein a substantial proportion of the nitrated copolymer defined in claim 6.

12. Composition comprising a major proportion of a petroleum hydrocarbon fraction containing dissolved therein a minor proportion of the nitrated copolymer defined in claim 6.

13. A nitrated styrene-isobutylene copolymer having a molecular weight of at least 2,000 and having a combined styrene content of about 40 to 60%, said nitrated product containing 0.1 to 15% of nitrogen and also containing sulfur.

14. A nitrated tripolymer of 1 to 60% by weight of styrene, 99 to 40% by weight of isobutylene, and 0.1 to 30% by weight of a $C_4$–$C_5$ polyolefin.

15. A process for nitrating copolymers which comprises reacting a styrene-isobutylene copolymer with nitric acid at a temperature of about 25° C. in the presence of sulfuric acid and carbon tetrachloride.

JOHN D. GARBER,
DAVID W. YOUNG.
WILLIAM J. SPARKS.

REFERENCES CITED

The following references are of record in the file of this patent:

UNITED STATES PATENTS

| Number | Name | Date |
|---|---|---|
| 2,063,158 | Greenewalt | Dec. 8, 1936 |
| 2,142,980 | Huijser | Jan. 3, 1939 |
| 2,274,551 | Kenyon et al. | Feb. 24, 1942 |
| 2,274,749 | Smyers | Mar. 3, 1942 |
| 2,314,212 | Hennion | Mar. 16, 1943 |
| 2,366,008 | D'Alelio | Dec. 26, 1944 |
| 2,438,340 | Johnson | Mar. 23, 1948 |
| 2,466,536 | Hardy | Aug. 10, 1948 |

OTHER REFERENCES

Ellis: "Chem. of Synthetic Resins," vol. II, page 1094 (1935).